Aug. 28, 1962 W. LEATHERS 3,051,309

DOCUMENT SORTER

Filed Jan. 3, 1958 6 Sheets-Sheet 1

INVENTOR.
WARD LEATHERS

BY Eli Weiss
ATTORNEY

Aug. 28, 1962 W. LEATHERS 3,051,309

DOCUMENT SORTER

Filed Jan. 3, 1958 6 Sheets-Sheet 2

INVENTOR.

WARD LEATHERS

BY Eli Weiss

ATTORNEY

Aug. 28, 1962 W. LEATHERS 3,051,309

DOCUMENT SORTER

Filed Jan. 3, 1958 6 Sheets-Sheet 3

INVENTOR.
WARD LEATHERS
BY
Eli Weiss
ATTORNEY

INVENTOR.
WARD LEATHERS
BY
Eli Weiss
ATTORNEY

Aug. 28, 1962 W. LEATHERS 3,051,309

DOCUMENT SORTER

Filed Jan. 3, 1958 6 Sheets-Sheet 5

INVENTOR.
WARD LEATHERS
BY
Eli Weiss
ATTORNEY

Aug. 28, 1962 W. LEATHERS 3,051,309

DOCUMENT SORTER

Filed Jan. 3, 1958 6 Sheets-Sheet 6

INVENTOR.
WARD LEATHERS
BY
Eli Weiss
ATTORNEY

United States Patent Office 3,051,309
Patented Aug. 28, 1962

3,051,309

DOCUMENT SORTER

Ward Leathers, Massapequa Park, N.Y., assignor to Burroughs Corporation, Detroit, Mich., a corporation of Michigan Filed Jan. 3, 1958, Ser. No. 706,949
7 Claims. (Cl. 209—72)

This invention relates generally to a document sorting device and more particularly to a device that transports documents of mixed sizes and thicknesses to remote areas.

Each day business firms receive and must sort large volumes of various size documents for distribution to their final destination. The movement of this paper could be expedited if the documents could be sorted automatically into groups of common or related information.

Each document must be scanned visually or automatically for content prior to being transported to an indexed receiving bin. Documents that are initially prepared for automatic sensing will display code markings in the form of holes, conductive ink, fluorescent ink, colored ink, magnetic ink, or the like to generate within a sensing means discrete signals representative of the information on the document. These signals are then utilized to initiate the selection of an appropriate bin for the document sensed.

Unfortunately, however, the bulk of documents utilized today vary in size and thickness and, therefore, to best serve industry, a sorter that can sort a stack of intermixed documents of various sizes and thicknesses into groups bearing related information is required by industry. Thus, not only must the device transport assorted size documents varying distances to appropriate receiving bins in accordance with manually observed or automatically sensed information; but it must function reliably with thin as well as with thick documents.

While it is relatively simply to transport only thick sheets of paper, thin sheets of paper present special problems. For example, a thin sheet of paper lacks rigidity and, therefore, is usually driven from the most forward edge. Any attempt to drive a thin sheet of paper from a position other than the most forward edge will generally result in the sheet being bunched, bent, creased or deformed. Unless supported along its entire length by an external member, a thin sheet of paper tends to droop or sag as a result of its own weight, and the free end or ends of a thin sheet of paper has a tendency to curl under or over the body of the sheet thus making it difficult to transport and stack the sheets in a flat manner. The transportation of sheets of mixed thicknesses and sizes presents greater problems.

To obtain high speed sorting each succeeding document of a stack of sheets should be processed without regard to the present position or destination of the previously sensed and removed document.

It is a primary object of this invention to provide an improved document sorter than can serially distribute documents of various sizes and thicknesses to remote destinations.

It is also an object of this invention to provide an improved paper sorting device that is economical to produce and reliable in operation.

Other objects and many of the attendant advantages of this invention will be readily appreciated as the apparatus becomes better understood by reference to the following detailed description when considered in connection with the accompanying drawings wherein.

Similar reference characters refer to similar parts throughout the several views of the drawings.

Briefly, a plurality of documents, or sheets of paper of various sizes and thicknesses are stacked one on top of another within a hopper to form a stack. Each sheet is scanned for destination identification and then pneumatically gripped by a moving conveyor belt for transportation over a row of aligned receiving bins. Pick-off fingers selected during the scanning procedure strip the paper from the moving belt for positioning within the desired bin. A travel timer, activated by signals generated when the document is sensed selects and operates the appropriate pick-off fingers.

The conveyor belt supports a plurality of concave depressions each communicating with a source of suction through a passageway in the belt. Each sheet of paper that is to be transported by the pneumatic conveyor belt is positioned to cover some of the concave depressions. Application of suction through the passageways creates a partial vacuum in each concave depression covered with a sheet of paper to lock the sheet of paper to the moving pneumatic conveyor belt.

Figures 1, 2:
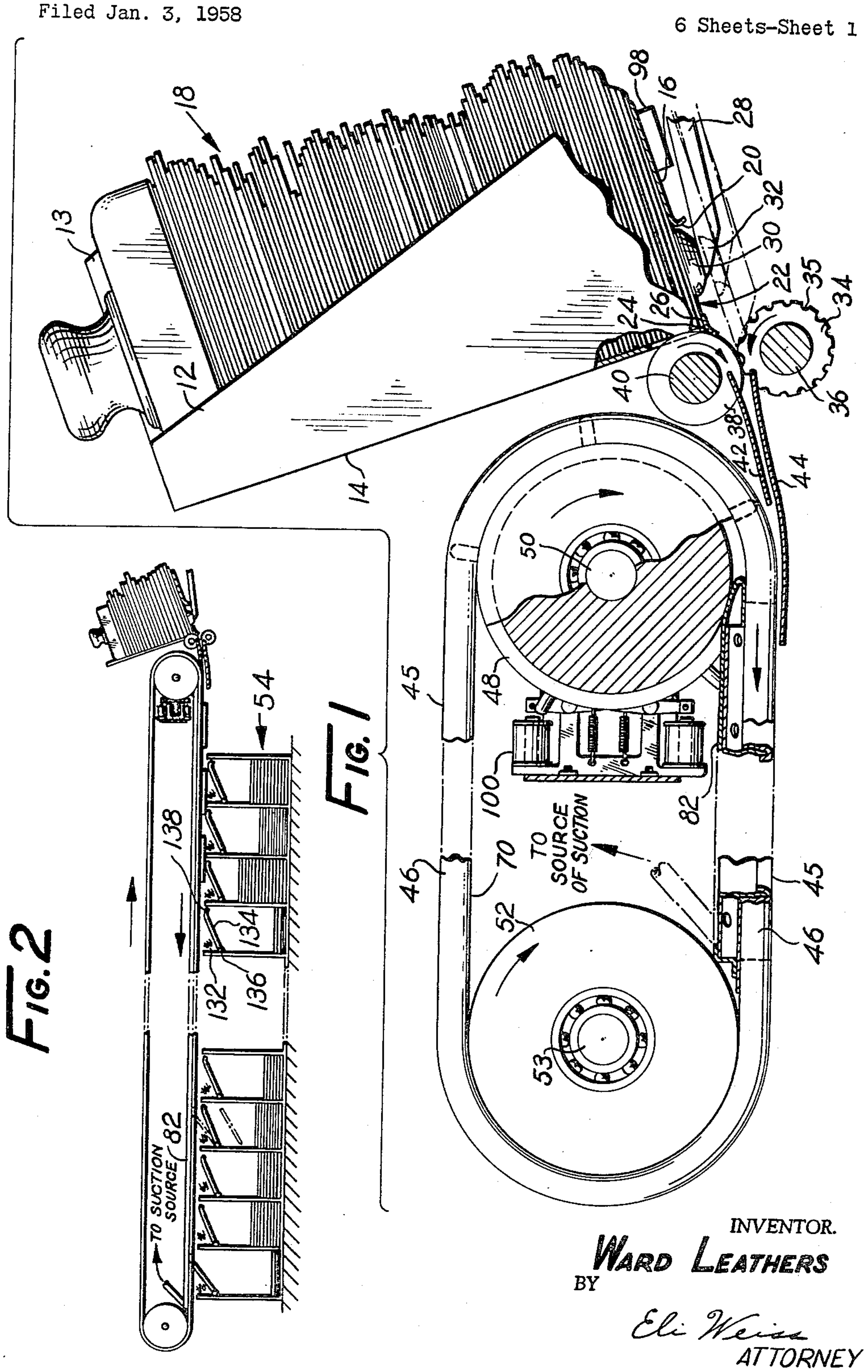
FIG. 1 is a detailed side view of structure in accordance with the principles of this invention.
FIG. 2 is a side view of structure in accordance with the principles of this invention illustrating the forming of a number of stacks.

With reference to FIG. 1, there is illustrated structure in accordance with the principles of this invention. Two side panels 12 and 13, a front panel 14 and a base plate 16 are secured together to form a hopper or a magazine that can accommodate a plurality of sheets of paper or documents 18 of various sizes and thicknesses positioned flat one on top of another to form a stack. The forward edge 20 of the base plate 16 is positioned rearwardly from the front panel 14 to provide an open access area 22 for the sequential removal of sheets from the bottom of the stack. The lower end 24 of the front panel 14 supports an inwardly projecting horizontal lip 26 which supports the forward edge of the stack and inhibits the simultaneous removal of more than one sheet of paper.

A side edge of each sheet of the stack of papers 18 is positioned to contact the side panel 12, and a front end edge of each sheet is positioned to contact the front panel 14. A cam driven pneumatic picker arm 28 positioned beneath the base plate 16 supports a suction cup 30 at one of its ends 32. The other end of the arm 28 is coupled to a linkage drive system which drives the end 32 of the arm 28, and therefore the suction cup 30, along a J-shaped path; its two extreme positions and in intermediate position being illustrated in FIG. 1. Initially, the pneumatic picker arm is activated to drive the suction cup 30 upward into the open access area 22 between the end 20 of the base plate 16, and the horizontal lip 26 to contact the exposed surface of the bottommost sheet of the stack 18.

The selective application of a source of suction to the suction cup 30 through a cooperating channel in the body of the picker arm 28 allows the suction cup to grip the bottommost sheet of the stack. The suction cup is then moved downward and horizontally towards the left to draw the front portion of the bottommost sheet of the stack partially out of the magazine through the open access area 22.

A first feed roller 34, rotatably supported by a shaft 36, contacts a second feed roller 38, rotatably supported by a shaft 40. The feed rollers are made of rubber or the like and are driven in the directions indicated by the arrows by a motor and appropriate gears. The outer surface of the first feed roller 34 contains a number of grooves 35 which facilitate the positioning of the sagging leading edge of a document between the two rollers 34 and 38.

The pneumatic picker arm 28, immediately prior to reaching its extreme left position, places the front or withdrawn end of the partially withdrawn bottom sheet of the stack between the two feed rollers 34 and 38. At this instant a timing cam disconnects the source of vacuum from the suction cup 30 and the feed rollers draw the bottom sheet out of the magazine. Continued rotation of the feed rollers drives the withdrawn sheet toward the left between two guides 42 and 44 for positioning adjacent to the front surface 45 of an endless belt 46.

The endless belt 46 is supported at one end by a sprocket drive wheel 48 positioned adjacent said feed rollers and rotatably supported by a shaft 50. The drive wheel 48 is coupled to a motor through appropriate gears to drive the belt 46 at a relatively uniform predetermined speed in the direction indicated by the arrow.

An idler pulley 52 rotatably supported by a shaft 53 supports the other end of the endless pneumatic belt 46. With reference to FIG. 2, the lower half of the endless belt passes over a plurality of aligned compartments or receiving bins 54.

Each receiving bin represents a particular classification category for the receipt of the documents. The endless belt 46, in cooperation with a source of suction, grips each document positioned adjacent to the front surface 45 of the endless belt 46, and transports it over the aligned compartments.

Figures 3, 5:
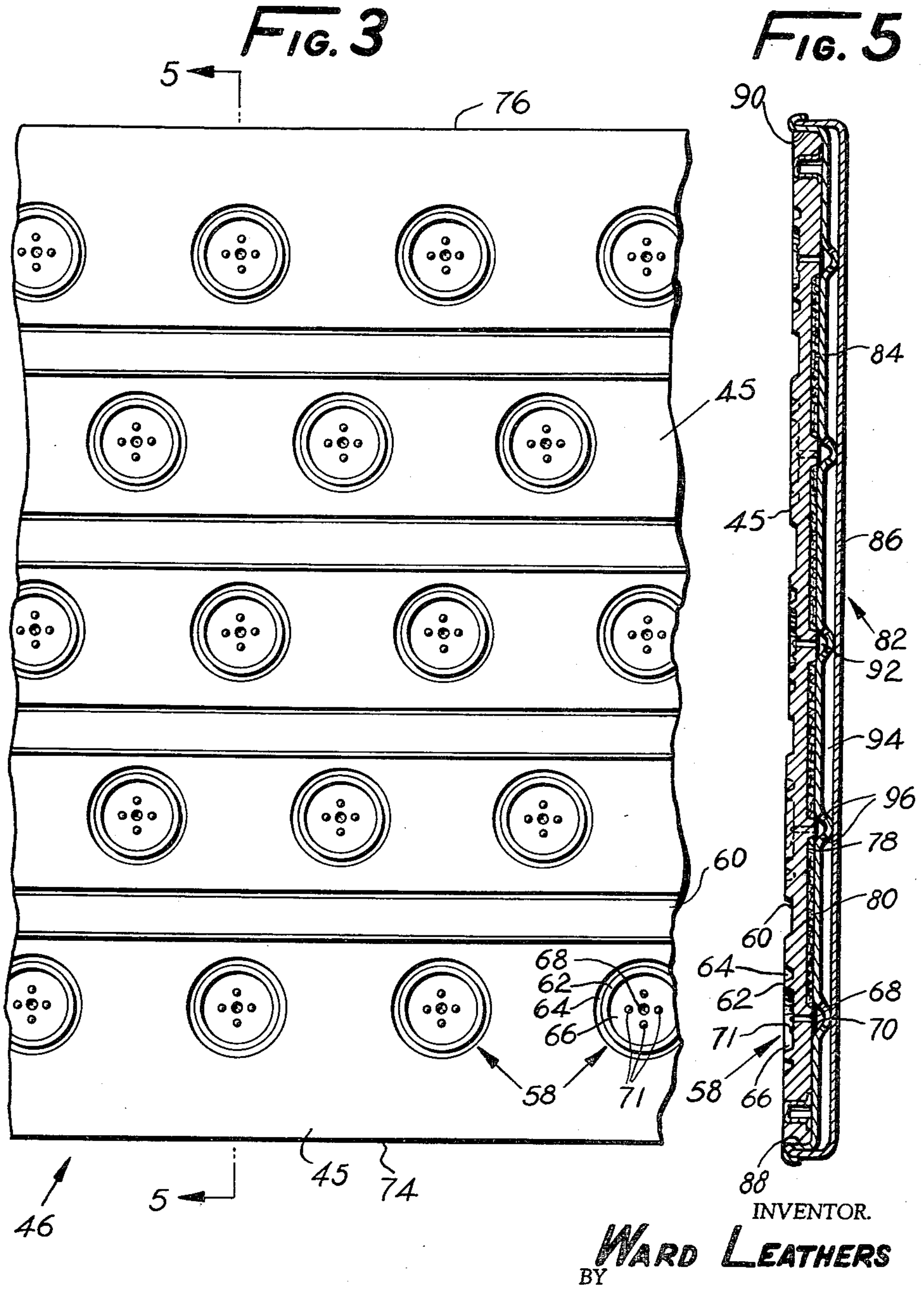
FIG. 3 is a front view of the document transporting structure.
FIG. 5 is a cross-sectional view along the line 5—5 of FIG. 3.

With reference to FIG. 3, there is illustrated an enlarged view of the front surface 45 of the endless belt 46. The front surface contains a number of shallow suction cup areas 58 arranged in rows that extend longitudinally around the belt. The suction cup areas of adjacent rows are staggered relative to each other. A channel 60 is positioned between adjacent rows of suction cup areas.

Figures 4, 6:
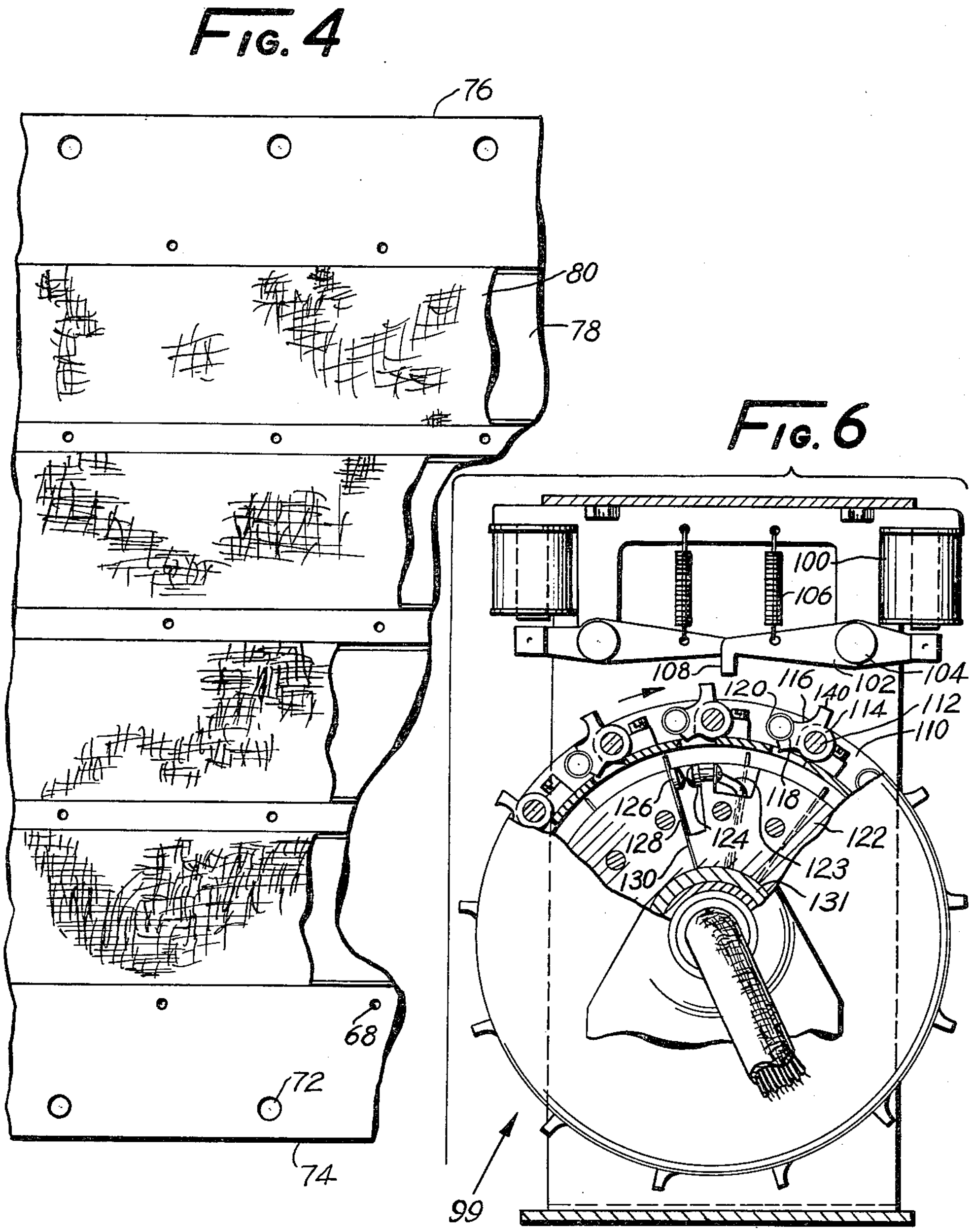
FIG. 4 is a rear view of the document transporting structure.
FIG. 6 is a side view of the travel timer where a portion of the side cover has been cut away.

Each suction cup area can be formed by retaining a thin flexible annular projection 62 positioned between an annular cutout area 64 and a circular cutout area 66. A passageway 68 connects the circular cutout area 66 with the rear surface 70 of the endless belt 46. The cross-sectional area of the passageway is small relative to the cross-sectional area of the circular cutout area 66, and the depth of the circular cutout area 66 is made as shallow as possible to reduce to a minimum the amount of air that must be evacuated to provide effective gripping of a covering document. In this manner it is possible to utilize low pressure differentials and provide a device that can operate satisfactorily with less than all of the circular cutout areas covered. A plurality of small projections 71 located within the circular cutout area 66 and positioned around the end of the passageway 68 prevent a covering document from being pulled downward to block the passageway 68 when suction is applied. FIG. 4 illustrates, partially in section, a view of the rear surface of the endless belt 46.

A plurality of circular cutouts 72 spaced uniformly around the endless belt adjacent to each side edge 74 and 76 cooperate with sprockets on the sprocket drive wheel 48 to insure synchronized movement of the endless belt 46 with the sprocket drive wheel 48.

Flat channel shape cutouts 78 extending longitudinally around the rear surface of the endless belt are positioned between adjacent rows of passageways 68. A thin strip of felt 80 impregnated with a lubricant of silicon-wax or the like is positioned securely within each cutout 78 to reduce the friction between the belt and a contacting vacuum conducting channel 82. With reference to FIGS. 1, and 2, the vacuum conducting channel 82 is positioned between the sprocket drive wheel 48 and the idler pulley 52 adjacent to the rear surface 70 of the lower portion of the endless belt 46.

Referring now to FIG. 5, there is illustrated a cross-sectional view through the width of the endless belt 46, and through the cooperating suction conducting channel 82.

The suction conducting channel assemblage 82 consists of a shallow U-shaped guide member 84 positioned partially within a shallow U-shaped base member 86. The base member 86 is secured to the guide member 84 by means of an airtight shaped metal joint along each of the side edges, or by solder or the like. The area 94 formed by the guide member 84 and the base member 86 is utilized as the main suction conduction duct. Two side walls 88 and 90 and a base member of the U-shaped guide member 84; and the lubricated felt strips 80 in the the endless belt 46. The side edges 74 and 76 of the belt 46 contact the sides 88 and 90 respectively of the guide member 84; and the lubricated felt strips 80 in the rear surface 70 of the belt 46 contact the base of the guide member 84. The side walls of the member 84 restrict the lateral displacement of the moving endless belt 46.

Each row of passageways traces a path along an aligned longitudinally extending depression 92 formed in the base of the shallow U-shaped guide member 84. The depression 92 divides the main suction conduction duct 94 into a number of parts. Small openings 96 located in the walls of the depressions 92 connect the main suction conducting duct 94 to adjacent passageways 68 through the depressions 92.

One end of the main suction conducting duct is connected to a source of suction through a flexible connector; and the other end is sealed from the atmoshpere by means of a plug; or by squeezing the top and bottom surfaces of the channel together to form an airtight joint.

The suction conducting channel assemblage 82 is positioned rigidly between the sprocket drive wheel 48 and the idler wheel 52 to couple the source of suction to each suction cup area 58 in the lower portion of the continuously moving endless belt 46.

Thus, a suction cup area 58 is coupled to the source of suction only when its connecting passageway 68 is adjacent to the cooperating depression 92; at all other times the passageway 68 is coupled to atmospheric pressure.

With reference to FIGS. 1 and 6, a travel timer 99 initiates the controlled removal of each document from the moving endless belt 46 in accordance with coded information displayed on each document. Each document in the stack 18 contains a particular area positioned relative to two adjacent reference edges for the display of the coded information. The coded information can be represented in any one of a number of different forms. However, to simplify the explanation it shall be assumed that the desired information is presented as a pattern of fluorescent spots activated by a light source and detected by a light sensitive unit 98 secured to the base plate 16. Initially, the two adjacent reference edges of each document are positioned adjacent to the front panel 14 and the side panel 12; and the side of the document that displays the coded information is positioned face downward to facilitate automatic scanning. The information sensed by the light sensitive unit or scanning unit 98 appears in the form of electrical pulse signals which are fed through a converter network to activate an appropriate interceptor coil 100. There is one interceptor coil 100 for each receiving bin 54.

Each coil 100, when energized, urges an armature 102 to rotate about a shaft 104 against the action of a spring 106 to drive the end 108 of the armature downward. Deactivation of the coil allows the spring 106 to rotate the armature about the shaft 104 to urge the end 108 of the armature upward. A rotatable cylindrical ring 110 rigidly coupled by rivets or the like to the sprocket drive wheel 48 supports a plurality of shafts 112 spaced uniformly around the ring 110. The longitudinal axis of each shaft 112 is positioned parallel to the longitudinal axis of each of the other shafts, and to the rotational axis of the cylindrical ring 110. Each shaft 112 supports a plurality of independently rotatable pawls 114, one for each compartment in the receiving bin 54. A holding spring 120 is positioned adjacent to and oriented parallel with each shaft 112. Each pawl 114 contains two cutout areas 116 and 118 which cooperate alternately with the holding spring 120. The pawl 114 is in an inactive position when the holding spring is positioned within the cutout 118 as illustrated; and when the pawl is rotated counterclockwise about the shaft 112 to position the spring 120 within the cutout 116 it is in an active position.

On each shaft 112, each rotatable pawl 114 represents a distinctive compartment in the receiving bin 54 for the receipt of documents. There is one shaft for each document that can be transported serially at any one instant by the pneumatic belt 46. Similarly positioned pawls on each shaft 112 are activated by the same armature 102 and represent the same compartment in the receiving bin 54.

A stationary cylinder 122 positioned within the rotatable cylindrical ring 110 supports a number of sets of electrical contacts arranged helically around the cylinder. Each set or pair of contacts consists of a stationary contact element 124, and a movable contact element 126. The stationary contact element is secured rigidly to the stationary cylinder 122 and connected to an electrical conductor 123. The movable contact element 126 is aligned with the stationary contact element 124 and secured to a relatively stiff spring member 128 by rivets or the like. One end 130 of the spring is anchored to the stationary cylinder 122. The free end of the spring member 128 projects outward beyond the circumference of the cylinder 122 to engage aligned activated pawls 114 when the cylinder 110 is rotated in a clockwise direction about the stationary cylinder 122 as indicated by the arrow. There is one set of contacts for each compartment in the receiving bin 54. The anchored end 130 of each spring is connected to a common electrical conductor through a brush contact and a slip ring 131. The electrical conductor 123 of each set of contacts is connected to energize an electromagnet positioned within a particular compartment of the aligned bins 54 by means of a source of potential through the brush and slip ring, and the contacts 124 and 126.

With reference to FIG. 2, for each compartment there is an electromagnet 132 and a set of fingers 134. Each set of fingers is pivotally supported by a shaft 136 secured to a wall of the compartment. Each electromagnet 132, when energized, positions a set of fingers 134 to an activated position. Energization of an electromagnet 132 rotates a cooperating set of fingers 134 counterclockwise about the shaft 136 to position the free ends 138 of a set of fingers within the channels 60 of the endless belt 46. The end 138 of each finger is bent along a relatively large radius to prevent damage to the belt.

In operation, a plurality of sheets of paper of various sizes and thicknesses are positioned flat one on top of another in the magazine to form a stack. Each document displays a code positioned accurately relative to a front reference edge and a side reference edge of a document. The documents are positioned in the hopper, code downward, with the two reference edges of each document positioned against the front panel 14 and the side panel 12 of the hopper. In this manner the code markings on large and small documents will appear at the same position. A code energizing and light sensitive unit 98 first activates and then scans the code markings of the bottommost sheet of the stack. The information sensed is fed to a converter which feeds a pulse signal to an interceptor coil 100. For each distinctive code pattern displayed by a document and sensed by the unit 98 a particular interceptor coil 100 will be energized. Energization of coil 100 urges the end 108 of the armature 102 downward against the action of spring 106 into the path of a pawl 114 of a row of pawls. The cylindrical ring 110 is rotated clockwise in synchronism with the endless belt 46. Continued rotation of the cylindrical ring 110 drives the vertically projecting tip 140 of the pawl 114 into the end 108 of the armature to urge the pawl to rotate counterclockwise about the shaft 112 to its energized position. Immediately after a pawl has been driven to its energized position, the interceptor coil is deenergized, and the spring 106 urges the armature 102 upward to prevent the setting of another pawl. Thus, the interceptor coil 100 is energized for a time duration sufficient to allow the setting or energizing of one pawl only in a row of pawls. Since the pawls of any one row of pawls are positioned to trace a path longitudinally across the cylindrical ring 110, and the sets of contacts are positioned helically around the cylinder 122, then each energized pawl in each row of pawls can close only one set of contacts during any one complete revolution of the cylinder 110. Orientation of a pawl from a deenergized position to an energized position effectively selects a particular compartment in the aligned bins 54 that will receive the document scanned.

Immediately after the code on the document is scanned, and the appropriate interceptor coil energized, a pneumatic picker arm 28 grips the front of the bottommost document of the stack, and draws it diagonally downward toward the left, to position the front edge of the document between the two drive rollers 34 and 38. The source of suction is then removed from the picker arm and the rollers drive the document towards the left between the guide members 42 and 44 to position the document adjacent to the front surface of the pneumatic conveyer belt 46.

The pneumatic belt picks up and carries the document over the aligned compartments of the bin 54. The rotatable cylindrical ring 110 rotates in synchronism with the conveyer belt to indicate the destination of the document. Immediately before the document reaches the desired compartment, the energized pawl 114 contacts and drives together a set of contacts thereby energizing a particular electromagnet 132. Energization of the electromagnet 132 urges the fingers 134 to rotate counterclockwise about the shaft 136 to position the end 138 of each finger in the channel 60 in the belt. If more than one document is being transported by the belt, the ends of the fingers are positioned within the channels after an undesired document has passed but before a desired document arrives.

Continued displacement of the belt 46 drives the forward edge of the desired document into and along the fingers which strips the document from the pneumatic belt and allows it to fall within the desired compartment flat on top of the previously received documents.

Returning to the operation of the contacts, further rotation of the cylindrical ring 110 after the contact 126 is driven against and stopped by the contact 124 results in a resetting force being applied to the pawl by the projecting end of the stopped spring member to urge the pawl 114 to rotate clockwise about the shaft 112 against the action of the spring 120 to its deactivated position. Thus, the pawls are set and reset automatically to allow continuous operation.

Mechanical or electrical means can be provided to insure positioning the fingers 134 within the channels 60 until the desired document has been removed completely from the pneumatic belt and allowed to fall into the desired compartment.

Figure 7:
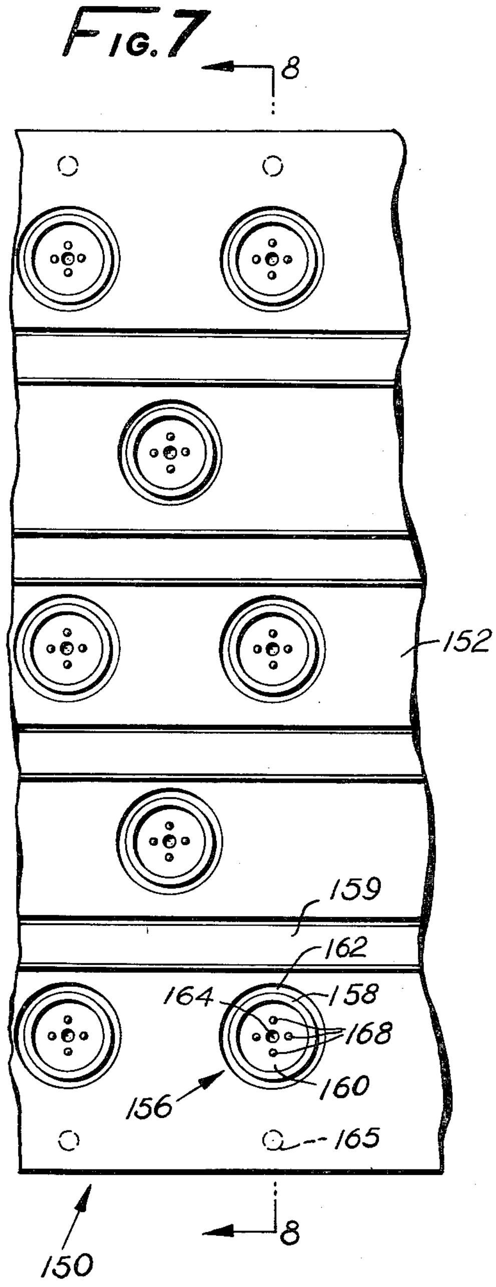
FIG. 7 is a front view of another document transporting structure.
Figure 8:
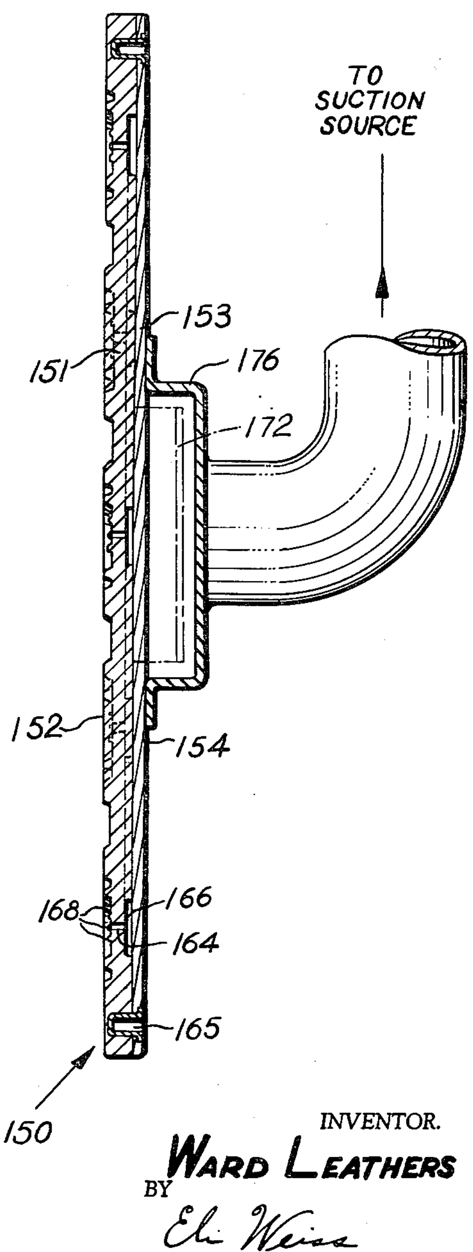
FIG. 8 is a view along the line 8—8 of FIG. 7.
Figure 9:
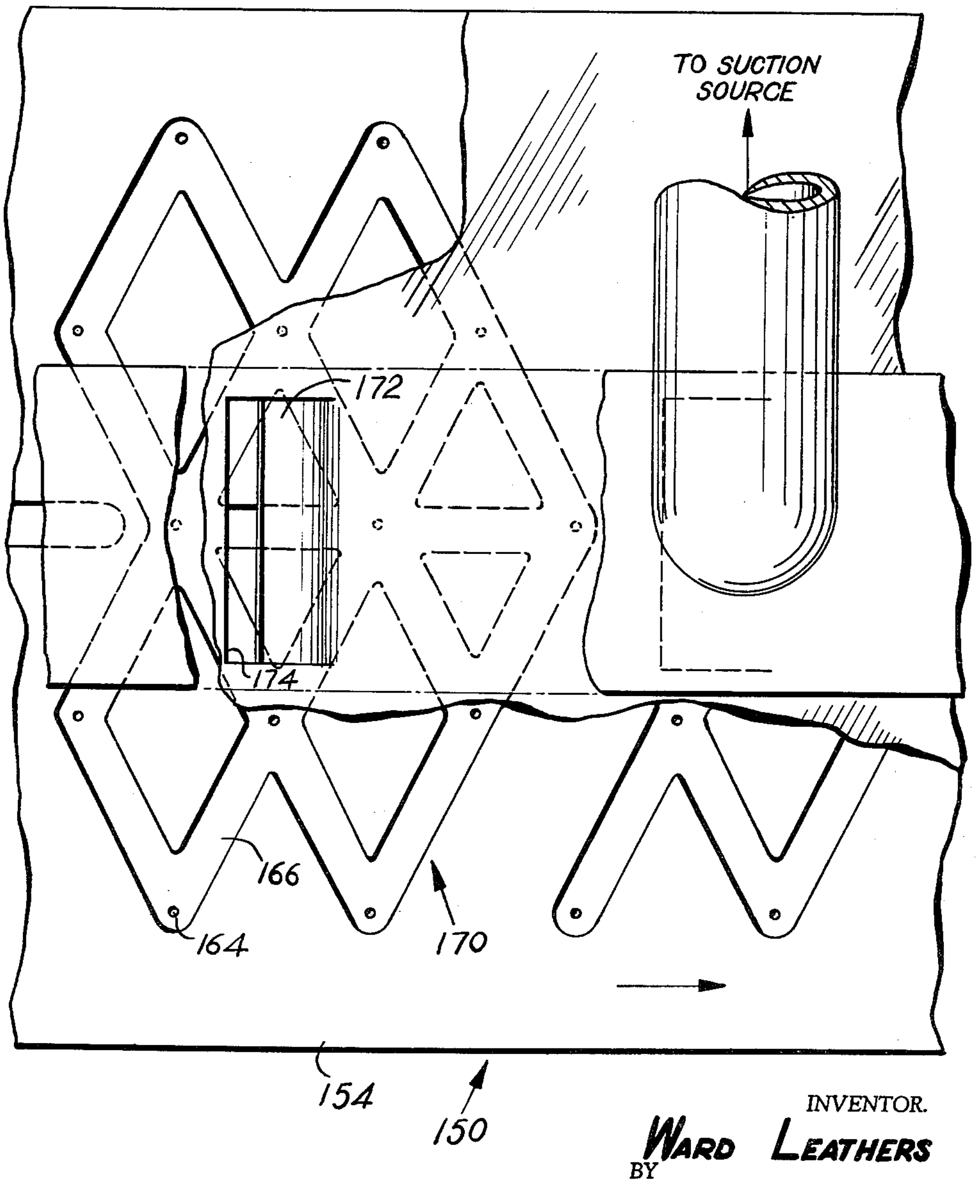
FIG. 9 is a view of the rear of the structure of FIG. 7 with a portion of the back removed.

With reference to FIGS. 7, 8, and 9 there is disclosed another type of pneumatic belt that can be utilized with the structure disclosed to grip and carry documents of various sizes to remote locations.

The endless pneumatic belt 150 having a front surface 152 and a rear surface 154, is made of two thin rubber belts 151 and 153 vulcanized together. The front surface 152 of the endless belt supports a number of suction cup areas 156 arranged to form a number of parallel rows each tracing a path completely around the belt. The suction cup areas of alternate rows are aligned with each other, and the suction cup areas of adjacent rows are staggered relative to each other. A channel 159 is positioned between and separates adjacent rows of suction cup areas. Each suction cup area 156 is formed by retaining a flexible annular projection 158 positioned between an inner cutout area 160 and an outer cutout area 162.

One end of a passageway 164 is centrally positioned within the inner cutout area 160. The other end of the passageway 164 is connected to a suction distribution duct 166. The cross-sectional area of the passageway 164 is small relative to the cross-sectional area of the inner cutout area 160 and the volume of the inner cutout area 160 is maintained as small as possible. A plurality of small projections 168 located within the inner cutout area 160 and positioned around the open end of the passageway 164 function as spacers to prevent a document that is being carried by the belt from being sucked down into the inner cutout area 160, when suction is applied, to isolate the passageway 164 from the inner cutout area 160 by contacting the open end of the passageway 164.

With reference to FIG. 9, there is disclosed a view of the belt with a portion of the back removed to illustrate the suction distribution duct system.

A number of suction distribution ducts are connected together to form a group 170. Each group is pneumatically isolated from every other group. The number of suction conducting passageways 164 connected to any one particular group of suction distribution ducts 166 is dependent upon the number of inner cutout areas it is desired to couple simultaneously to the source of suction.

The groups of suction distribution ducts are located within the belt between the front surface 152 and the rear surface 154.

The endless belt 150 is thin and flexible, the front portion 151 is composed of soft neoprene rubber or the like molded by a rolling process and supports all of the suction cup areas 156, channels 159, passageways 164, and suction conducting ducts 166. The rear portion 153 of the belt is composed of smooth rubberized fabric.

The rear portion 153 of the belt 150 supports a one way airtight suction operable flap type valve member 172.

There is one valve 172 for each distinctive group of suction conducting ducts 170. To facilitate the rapid response of the network 170 to the application of a source of suction, a connecting channel 174 is positioned directly beneath the valve member 172.

A nozzle 176 slidably coupled to the rear surface 154 of the endless belt 150 couples a source of suction to each of the valve members 172 in the lower loop portion of the endless belt.

The endless belt 150 and the nozzle 176 illustrated in FIG. 8 is substituted for the endless belt 46 and the suction conducting channel assemblage 82 illustrated in FIGS. 1 and 2. A source of suction is connected to the nozzle 176; and rotation of the drive wheel 48 positively drives the endless pneumatic belt 150 by means of the circular cutout 165 to serially position one or more valve members 172 under the nozzle 176. Each instant that a suction operable valve member 172 passes beneath the nozzle 176, the valve opens to couple the source of suction to a group of suction cup areas simultaneously to facilitate the gripping of a sheet of paper positioned adjacent to the front surface of the belt to transport it to a remote area. By extending the length of the nozzle 176, to occupy the full space between the drive wheel 48 and the idler pulley 52, then each suction cup area in the belt will be coupled to the source of suction when it is over the aligned compartments 54.

Immediately after a suction openable valve member 172 passes out from beneath the nozzle 176, atmospheric pressure closes the valve member 172 tightly because of the decreased pressure within each of the inner cutout areas 160 covered by a document, and the decreased pressure within the group 170 of suction distribution ducts. The rapid closing of the valve member 172 permits the retention of a small suction within each suction cup area for a short period of time, determined by the leakage of air into the belt, to permit the continued gripping of a document after the source of suction has been removed from the particular valve member.

To facilitate the closing of the suction sensitive valve member as it emerges from beneath the nozzle, and to eliminate the possibility of jamming, the valve member 172 is hinged along its forward edge, defined by that edge that first enters and leaves the nozzle area.

Figures 10, 11:
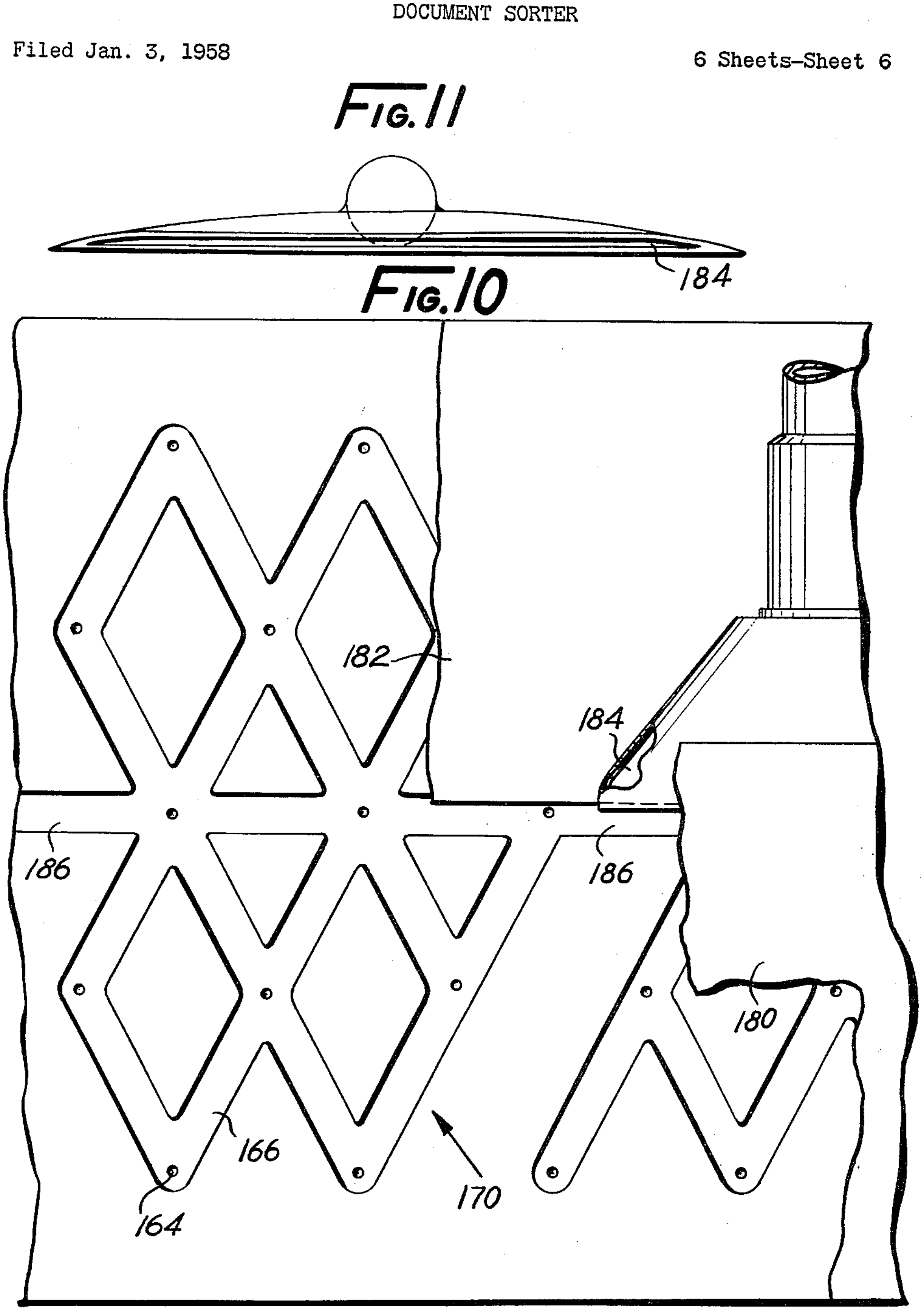
FIG. 10 is a view of the rear of still another document transporting structure.
FIG. 11 is a view of a nozzle for utilization with the structure of FIG. 10.

In still another embodiment of this invention the rear portion of the belt disclosed in FIGS. 8 and 9 is replaced with a rear portion that is split along its entire length to form two sections. One section is positioned to overlap the other section to form a one way airtight valve that extends continuously around the belt. This embodiment is disclosed in FIGS. 10 and 11.

In more detail, the rear portion consists of a first section 180 positioned to overlap a second section 182. The second section 182 is positioned securely to the back of the front portion 151 of the belt to form a cover for a portion of each group of suction distribution ducts. The first section 180 is positioned securely to the back of the front portion 151 to form an airtight cover for the remaining portion of each group of suction distribution ducts and overlaps but is not secured to the second section to provide an openable access area that extends completely around the belt.

A triangular shaped or tapered nozzle 184 is positioned, apex first, between the first section 180 and the second section 182. The first section 180 is positioned above the nozzle, and the second section is positioned below the nozzle.

The triangular shaped nozzle is relatively thin and does not present abrupt changes in contour to facilitate the formation of an airtight joint between the nozzle and the first and second sections 180 and 182 to inhibit the flow of air past the nozzle to the ducts positioned within the belt. At all other points along the belt the overlapped valve member provides an airtight joint to inhibit the flow of air to the ducts positioned within the belt.

To insure the distribution of suction from the source of suction to each group of suction conducting passageways, a connecting channel 186 is provided between each group of suction conducting ducts 170 when a narrow nozzle is provided. In those instances where the width of the nozzle extends completely over the path traversed by a document, then the connecting channels will not be required.

In operation, the belt is driven at a continuous speed while the triangle or tapered nozzle is maintained in a fixed position. The nozzle, in combination with the first and second sections 180 and 182 provides a leak proof structure for connecting a source of suction to the groups of suction distribution ducts. Displacement of the belt relative to the nozzle results in the nozzle advancing progressively between the first and second sections 180 and 182 to provide a continuous slidable valve member.

In those instances where optical scanning of a document is required, such as the sorting of incoming mail or the like, then the hopper is positioned to permit removal of the topmost sheet of the stack rather than the bottommost sheet of the stack. A spring mechanism acting against the bottommost sheet is required to maintain the top of the stack at a predetermined position, and removal of the topmost sheet occurs only after the operator visually scans the document and depresses a button that indicates the proper destination for the document. Thus, the button not only sets the travel timer or memory device, but it also initiates the mechanism for the removal of the scanned document.

In actual use, this invention can sort documents serially; it is not necessary to deposit one document in a compartment prior to the automatic handling of the next document.

In the construction of this invention care should be exercised to provide proper timing to allow the longest document that is to be sorted to be picked up and transported without interfering with the document next received.

Obviously many modifications and variations of the present invention are possible in the light of the above teachings. It is therefore to be understood that within the scope of the appended claims the invention may be practiced otherwise than as specifically described.

What is claimed is:

1. In a device adapted to sort a stack of intermixed documents of various sizes into groups bearing related information, a source of suction, a document carrier comprising a flexible endless belt having a front surface and a rear surface, a first plurality of circular cutouts extending partially through said belt from the front surface and arranged one behind another in a row around said belt each to form a closed chamber when covered by a document, a second plurality of circular cutouts extending partially through said belt from the front surface and arranged one behind another in a row around said belt each to form a chamber when covered by a document, a first plurality of small diameter open suction restrictive conducting passageways each coupling a circular cutout of said first plurality of circular cutouts to the rear surface of said belt, a second plurality of small diameter open suction restrictive conducting passageways each coupling a circular cutout of said second plurality of circular cutouts to the rear surface of said belt, a primary suction conducting channel fed by said source of suction and slidably coupled to the rear surface of said belt, a secondary suction conducting channel interposed between said primary suction conducting channel and the rear surface of said belt and aligned to couple a group of said first plurality of small diameter open suction restrictive conducting passageways to said primary suction conducting channel, another secondary suction conducting channel interposed between said primary suction conducting channel and the rear surface of said belt and aligned to couple a group of said second plurality of small diameter open suction restrictive conducting passageways to said primary suction conducting channel, drive means coupled to drive said belt to advance said first and second plurality of small diameter open suction restrictive conducting passageways past said secondary suction conducting channels, a document pickoff channel positioned between said first and second plurality of circular cutouts on said belt, a pickoff finger, and orienting means responsive to information borne by said documents coupled to position an end of said pickoff finger within said document pickoff channel to remove a document from said belt.

2. In a device adapted to sort a stack of intermixed documents of various sizes into groups bearing related information, a source of suction, a document carrier comprising a conveyor belt having a front surface and a back surface, a circular cutout extending partially through said belt from said front surface to form a closed chamber when covered by a document, a suction conducting member fed from said source of suction and slidably coupled to cover a portion of the back surface of said belt, a small diameter suction restrictive conducting passageway interposed between said circular cutout and said back surface of said belt to couple said source of suction to said circular cutout to provide a slow rate of increase of suction within the closed chamber, and valve means coupled to close said small diameter suction restrictive conducting passageway.

3. In a device adapted to sort a stack of intermixed documents of various sizes into groups bearing related information, a source of suction, a document carrier comprising a conveyer belt having a front surface and a rear surface, a circular cutout extending partially through said belt from said first surface, an annular cutout circumscribing said circular cutout and extending partially through said belt from said front surface said cylindrical cutout and said annular cutout forming an annular ring projection coupled to the front surface of said belt to form a closed chamber when covered by a document, a suction conducting member fed from said source of suction and slidably coupled to a portion of the back surface of said belt, a small diameter suction restrictive conducting passageway interposed between the circular cutout and said rear surface of said belt to permit said source of suction to provide a slow rate of increase of suction within the closed chamber, a projection positioned within the circular cutout positioned adjacent to said conducting passageway to prevent the document from closing the end of said small diameter suction restrictive conducting passageway, and valve means coupled to the rear surface of said belt to close said small diameter suction restrictive conducting passageway.

4. In a device adapted to sort a stack of intermixed documents of various sizes into groups bearing related information, a source of suction, a document carrier comprising a flexible endless belt having a front surface and a rear surface, a first plurality of circular cutouts extending partially through the belt from the front surface arranged around said belt each to provide a closed chamber when covered by a document, a second plurality of circular cutouts extending partially through the belt from the front surface arranged around said belt each to provide a closed chamber when covered by a document, a first network of connecting suction conducting ducts positioned between said front and rear surfaces of said belt, first small diameter suction restrictive conducting passageways interposed between said first network of connecting suction conducting ducts and selected circular cutouts in said first and second plurality of circular cutouts, a first flexible valve member hinged to said rear surface of said belt and coupled to said first network of connecting suction conducting ducts, a second network of connecting suction conducting ducts positioned between said front and rear surfaces of said belt, second small diameter suction restrictive conducting passageways interposed between said second network of connecting suction conducting ducts and other selected circular cutouts in said first and second plurality of circular cutouts, a second flexible valve member hinged to said rear surface of said belt and coupled to said second network of connecting suction conducting ducts, a source of suction, a conducting member interposed between said source of suction and said rear surface of said belt, and drive means coupled to advance said belt to consecutively couple said first and second flexible valve members to said suction conducting member.

5. In a device adapted to sort a stack of intermixed documents of various sizes into groups bearing related information, a source of suction, a document carrier comprising a flexible endless belt having a front surface and a rear surface, a first plurality of circular cutouts extending partially through the belt from the front surface and arranged one behind another around said belt each to provide a closed chamber when covered by a document, a second plurality of circular cutouts extending partially through the belt from the front surface of said belt and arranged one behind another around said belt each to provide a closed chamber when covered by a document, a first network of connecting suction conducting ducts positioned between said front and rear surfaces of said belt, first small diameter suction restrictive conducting passageways interposed between said first network of connecting suction conducting ducts and selected circular cutouts in said first and second plurality of circular cutouts, a first flexible valve member hinged to said rear surface of said belt and coupled to selectively open and close an end of said first network of connecting suction conducting ducts, a second network of connecting suction conducting ducts positioned between said front and rear surfaces of said belt, second small diameter suction restrictive conducting passageways interposed between said second network of connecting suction conducting ducts and other selected circular cutouts in said first and second plurality of circular cutouts, a second flexible valve member hinged to said rear surface of said belt and coupled to selectively open and close an end of said second network of connecting suction conducting ducts, a suction conducting member interposed between said source of suction and said rear surface of said belt, drive means coupled to advance said belt to consecutively couple said first and second flexible valve members to said suction conducting member, a document pickoff channel coupled to the front surface of said belt, a pickoff finger, and orienting means responsive to information borne by said documents coupled to position said pickoff finger within said document pickoff channel to strip a document from said belt.

6. In a device adapted to sort a stack of intermixed documents of various sizes into groups bearing related information, a source of suction, a document carrier comprising a conveyer belt having a front surface and a rear surface, a circular cutout extending partially through said belt from said front surface to form a closed chamber when covered by a document, a continuous self-closing valve coupled to the rear surface of said belt, a nozzle coupled to said source of suction and slidably coupled to progressively open said valve member, and a small diameter suction restrictive conducting passageway interposed between said circular cutout and said continuous self-closing valve to couple the suction from said nozzle to said circular cutout to provide a slow rate of increase of suction in the closed chamber to grip the covering document.

7. In a device adapted to sort a stack of intermixed documents of various sizes into groups bearing related information, a source of suction, a document carrier comprising a conveyer belt having a front surface and a rear surface, a circular cutout extending partially through said belt from said front surface to form a closed chamber when covered by a document, a continuous self-closing overlapped valve coupled to the rear surface of said belt, a tapered nozzle fed by said source of suction and slidably coupled to progressively open said valve member, and a small diameter suction restrictive conducting passageway interposed between said circular cutout and said continuous self-closing overlapped valve to couple said source of suction to said circular cutout to provide a slow rate of increase of suction in the closed chamber to grip the covering document.

References Cited in the file of this patent

UNITED STATES PATENTS

| | | |
|---|---|---|
| 1,829,984 | Ehlig | Nov. 3, 1931 |
| 1,853,781 | Rider | Apr. 12, 1932 |
| 2,023,531 | Kleinschmidt et al. | Dec. 10, 1935 |
| 2,175,941 | Keays | Oct. 10, 1939 |
| 2,617,528 | Moore | Nov. 11, 1952 |
| 2,752,154 | Nelson | June 26, 1956 |
| 2,795,328 | Tyler | June 11, 1957 |
| 2,812,079 | Carnine | Nov. 5, 1957 |
| 2,850,279 | Stoothoff | Sept. 2, 1958 |
| 2,856,187 | Burckhardt | Oct. 14, 1958 |
| 2,914,289 | Schutt | Nov. 24, 1959 |

FOREIGN PATENTS

| | | |
|---|---|---|
| 751,931 | B. T. M. Great Britain | July 4, 1956 |

UNITED STATES PATENT OFFICE

CERTIFICATE OF CORRECTION

Patent No. 3,051,309 August 28, 1962

Ward Leathers

It is hereby certified that error appears in the above numbered patent requiring correction and that the said Letters Patent should read as corrected below.

Column 4, line 23, for "84; and the lubricated felt strips 80 in the" read -- 84 provide a channel to accomodate --.

Signed and sealed this 19th day of February 1963.

(SEAL)
Attest:

ESTON G. JOHNSON

Attesting Officer

DAVID L. LADD

Commissioner of Patents